No. 857,981. PATENTED JUNE 25, 1907.
W. L. CLARK.
TOOL HOLDER FOR MACHINE TOOLS.
APPLICATION FILED JAN. 18, 1907.
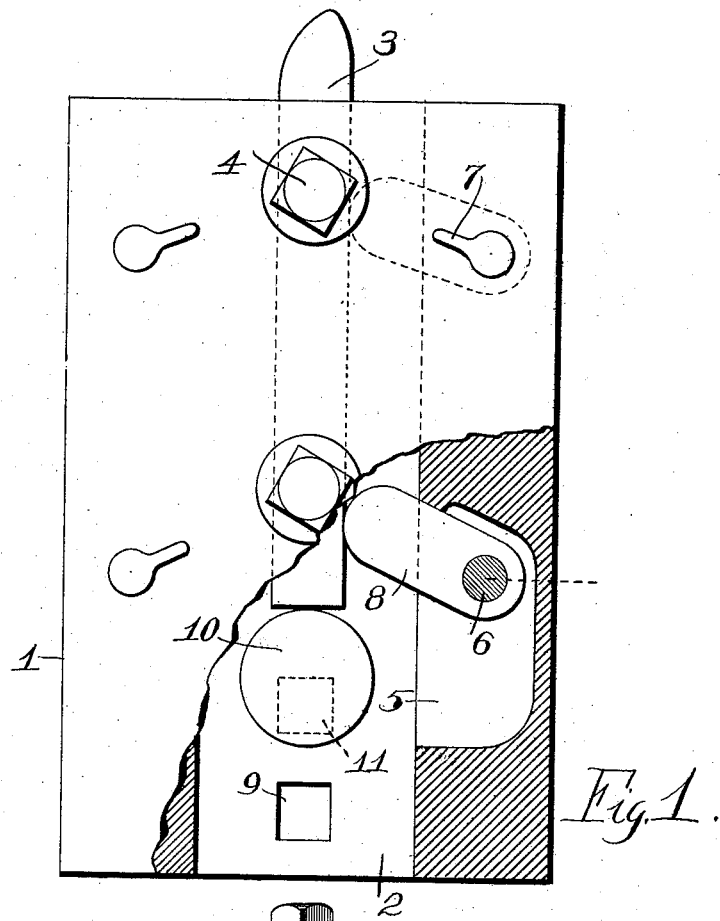
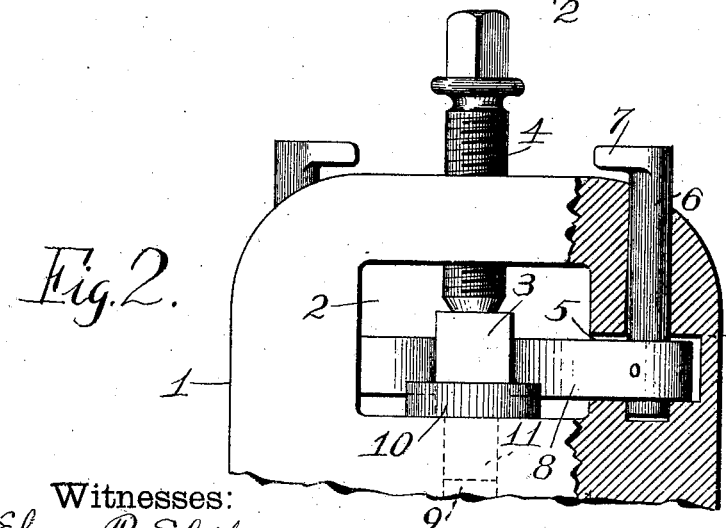
Witnesses:
Elmer R. Shipley.
M. S. Belden.
Walter L. Clark
Inventor
by James W. See
Attorney

UNITED STATES PATENT OFFICE.

WALTER L. CLARK, OF NEW YORK, N. Y.

TOOL-HOLDER FOR MACHINE-TOOLS.

No. 857,981.      Specification of Letters Patent.      Patented June 25, 1907.

Application filed January 18, 1907. Serial No. 352,871.

*To all whom it may concern:*

Be it known that I, WALTER L. CLARK, a citizen of the United States, residing at New York, New York county, New York, have invented certain new and useful Improvements in Tool-Holders for Machine-Tools, of which the following is a specification.

In tool holders for machine tools, such as lathes, for instance, it has long been customary, in the use of tools formed from rough bar steel stock, to hold the tool by clamping friction at its top and bottom. While this is ample in ordinary cases it is not sufficient in the case of very heavy cuts with heavy feeds working in hard material, as, for instance, in the turning of the tires of car-wheels and locomotive driving wheels in modern high duty lathes. Recourse has therefore been had to side supports for the tool to bear the brunt of the work, the clamping devices, whatever they may be, requiring only to prevent the upward displacement of the tool. But in certain classes of work of the particular character above referred to, the shanks of the tools vary a great deal in width. For instance, narrow tools may be used for roughing cuts while a contour finishing tool may have a shank several inches wider than that of the roughing tool. If the side supports for the shank of the tool are of a threaded character much time is lost in adjusting the side supports to suit the great variation in the width of tool-shanks.

It is the object of my improvement to facilitate the quick adjustment of the side supports in a tool holder.

My invention will be readily understood from the following description taken in connection with the accompanying drawing in which:—

Figure 1 is a plan, part horizontal section, of a tool holder embodying my invention: and Fig. 2 is a rear elevation, part vertical transverse section.

In the drawing:—1, indicates a tool holder of not unusual general form: 2, the tool-receiving recess extending longitudinally through the same: 3, the tool disposed in this recess and resting on the floor thereof:
4, set screws supported by the tool holder above the tool and typifying means for holding the tool down: 5, inwardly open pockets in the side walls of the tool-receiving recess, there being preferably a plurality of these pockets at each side of the tool: 6, a spindle journaled in the tool holder and passing into each of the pockets: 7, handles on the ends of the spindles to permit them to be turned: 8, a block in each pocket and fast on its appropriate spindle, these blocks being adapted to project inwardly toward the tool and bear against its shank or, alternatively, to be turned back into the pockets, the form of the blocks being immaterial so long as these conditions may be fulfilled: 9, a plurality of upwardly open non-circular mortises in the floor of the tool-holding recess to the rear of the tool: 10, a cam, shown as being circular, lying upon the floor of the tool-receiving recess and bearing against the rear end of the tool: and 11, a non-circular stud fast with the cam and projecting downwardly from it and fitting the mortises in the floor of the recess.

If there be four of the retractile blocks 8 they may all be swung inwardly in case a narrow tool is to be used, and they may all be swung outwardly into the pockets if a wide tool is to be used. If a tool be employed with its shank resting against one side wall of the tool-receiving recess then it will be obvious that the retractile blocks need be provided at the opposite side only of the recess. Again, it is recognized by lathesmen that when a tool is feeding to the left, for instance, its forward portion tends, under the working strain, to shift to the right in the tool holder while its rear end may tend to shift to the left, the tool acting in a lever-like manner. In practice it will be found that a single retractile block employed on the proper side of the forward portion of the tool will properly meet side thrust due to the cutting strain. In other words, the opposite side of the tool may be left without any special side support.

The retractile block is illustrated as being arranged, when swung into active position, to pass a line at right angles to the tool and cutting the center of rotation of the block, the block stopping against the front wall of its pocket, under which circumstances the side strain on the block has no tendency to turn it back to idle position.

The cam 10 forms a back stop to meet the end thrust on the tool and by setting the cam stud in selective angular positions in a given mortise several minor adjustments may be given to the portion of the cam bearing against the heel of the tool, and by shifting the cam from one mortise to another a quick and great adjustment may obviously be made. The cam stud may fit the mortises freely so that the cam may be readily picked from a given mortise and placed at another mortise.

I claim:—

1. A tool holder having a tool-receiving surface, means for clamping a tool to said surface, and a pivoted block supported by the tool holder in position to engage the side of the tool and adapted to be turned to inactive position away from the side of the tool, combined substantially as set forth.

2. A tool holder having a tool-receiving recess provided with a pocket in its side wall, means for clamping a tool to the floor of the recess, and a block pivoted within said pocket in position to engage the side of the tool and adapted to be turned back into the pocket away from the tool, combined substantially as set forth.

3. A tool holder having a tool-receiving recess provided with a pocket in one of its side walls, means for clamping a tool to the floor of the recess, a spindle journaled in the tool holder crossing said pocket, a handle on the spindle, and a pivoted block disposed in the pocket and fast with the spindle and adapted to project into the recess and engage the side of the tool or to be turned back into the pocket away from the side of the tool, combined substantially as set forth.

4. A tool holder having a tool-receiving recess provided with a pocket in one of its side walls, means for clamping a tool to the floor of said recess, a block pivoted in said pocket in position to engage the side of the tool and adapted to be turned back into the pocket away from the side of the tool, and a stop carried by an end wall of said pocket to be engaged by the block when in outward active position, combined substantially as set forth.

5. A tool holder having a tool-receiving surface, means for clamping a tool to said surface, and an angularly adjustable cam carried by said surface and adapted to engage the heel of the tool, combined substantially as set forth.

6. A tool holder having a tool-receiving surface provided with a non-circular mortise at the rear of the tool, means for clamping a tool to said surface, a cam adapted to engage the heel of the tool, and a non-circular stud projecting from the base of the cam and fitting the mortise, combined substantially as set forth.

7. A tool holder having a tool-receiving surface provided with a plurality of non-circular mortises at the rear of the tool, means for clamping a tool to said surface, a cam adapted to engage the heel of the tool, and a non-circular stud projecting from the base of the cam and selectively fitting the mortises, combined substantially as set forth.

WALTER L. CLARK.

Witnesses:
 M. E. STODDART,
 M. S. BELDEN.